(12) United States Patent
Fang et al.

(10) Patent No.: US 6,752,916 B1
(45) Date of Patent: Jun. 22, 2004

(54) ELECTROCHEMICAL PLANARIZATION END POINT DETECTION

(75) Inventors: Yan Fang, Fremont, CA (US); Jayanthi Pallinti, Santa Clara, CA (US); Ronald J. Nagahara, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 62 days.

(21) Appl. No.: 10/061,519

(22) Filed: Feb. 1, 2002

(51) Int. Cl.[7] .............................................. C25D 21/12
(52) U.S. Cl. ............................ 205/82; 205/83; 205/84; 205/640; 205/641; 205/644; 205/645
(58) Field of Search ............................. 205/82, 83, 84, 205/640, 641, 644, 645

(56) References Cited

U.S. PATENT DOCUMENTS

2002/0108861 A1 * 8/2002 Emesh et al. ................. 205/81
2003/0136684 A1 * 7/2003 Duboust et al. ............ 205/640

* cited by examiner

*Primary Examiner*—Wesley A. Nicolas
(74) *Attorney, Agent, or Firm*—Luedeka, Neely & Graham PC

(57) ABSTRACT

A method for determining an end point of a planarization process for removing metal from a surface of a substrate submerged in an electrolytic solution or slurry. A first electrode is provided which is operable to contact the surface of the substrate, such as a working electrode of a potentiostat system. A second electrode is provided which is operable to contact the electrolytic solution, such as a reference electrode of the potentiostat system. The first electrode is contacted to the surface of the substrate and an electrochemical property is measured, such as the electrochemical potential between the first and second electrodes, where the electrochemical property is indicative of an electrochemical characteristic of the substrate-slurry system. The planarization process is preferably stopped when a substantial change in the electrochemical potential of the system is measured. By measuring the electrochemical potential between the substrate and slurry using the first and second electrodes during the planarization process, the present invention provides an accurate indication of the time at which the metal is completely removed from the surface of the substrate. Thus, implementation of the invention substantially reduces the probability of removing too much or too little material during planarization.

14 Claims, 4 Drawing Sheets

ELECTROCHEMICAL PLANARIZATION END POINT DETECTION

FIELD

This invention relates to the field of integrated circuit fabrication. More particularly, the invention relates to detecting an end point in a planarization process, such as an electrochemical planarization process.

BACKGROUND

Generally, the fabrication of an integrated circuit includes the formation of conductive structures within the various layers of the circuit These structures include metal vias, which provide a conductive path from one layer to another, and metal traces, which connect devices within the same layer.

The processes for forming such conductive structures generally involve a metal deposition step such as electroplating, chemical vapor deposition, or physical vapor deposition, and a planarization step such as chemical mechanical polishing or electrochemical planarization to remove unwanted portions of the metal applied during the deposition step, thereby leaving the metal only in the vias or trenches to form interconnects. More recent processes, such as electrochemical mechanical deposition, combine the deposition and planarization steps such that much of the unwanted metal is removed while the desired metal structures are forming.

A critical factor in practically any metal planarization process is determining when the process should end. For example, if a polishing process continues for too long a time, the polishing removes some of the metals in the vias or trenches, which were not intended to be removed. If the polishing process continues for too short a time, the polishing will not completely remove the portions of the metal layer that were intended to be removed.

Currently, determining the end point of a planarization process is based at least in part upon assumptions made about the thickness and hardness of the material to be removed, and the abrasive properties of the polishing pad and polishing slurry. If any of these assumptions are inaccurate, then the end point of the planarization process will not be determined correctly.

What is needed, therefore, is a system for accurately detecting the end point of a planarization process.

SUMMARY

The above and other needs are met by an apparatus for determining an end point of an electrochemical planarization process for removing a metal from a surface of a substrate submerged in an electrolytic solution. The apparatus includes a pad having a pad surface for at least intermittently contacting the surface of the substrate. The apparatus also includes a first electrode, such as a working electrode in a potentiostat system, operable to contact the surface of the substrate, and a second electrode, such as a reference electrode in a potentiostat system, operable to contact the electrolytic solution. A voltage sensing circuit, such as a potentiostat, is coupled to at least the first and second electrodes for sensing a change in the electrochemical potential between the first and second electrodes.

A preferred embodiment of the apparatus includes a controller coupled to the potentiostat. The controller generates a process control signal for stopping the planarization process based on a substantial increase in the electrochemical potential between the first and second electrodes as indicated by the potentiostat.

By measuring the electrochemical potential between the surface of the substrate and the electrolytic solution during a planarization process, the present invention provides a more accurate indication of the time at which the conductive material is completely removed than was previously available. Thus, implementation of the invention substantially reduces the probability of removing too much or too little material during the planarization process.

In another aspect, the invention provides a method for controlling a process, such as an electrochemical planarization process, wherein a thickness of a conductive material, such as copper, is altered on a surface of a substrate. Electrical continuity is established between the surface of the substrate and a first electrode, such as a working electrode of a potentiostat system. The surface of the substrate is brought into contact with an electrically conductive solution, and electrical continuity is established between the solution and a second electrode, such as a reference electrode of the potentiostat system. The method includes measuring a value of an electrochemical property, such as the electrochemical potential, between the first electrode and the second electrode, and interpreting the value of the electrochemical property as a measure of the electrical conductivity of the surface of the substrate. The planarization process is then controlled based on the value of the measured electrochemical property.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
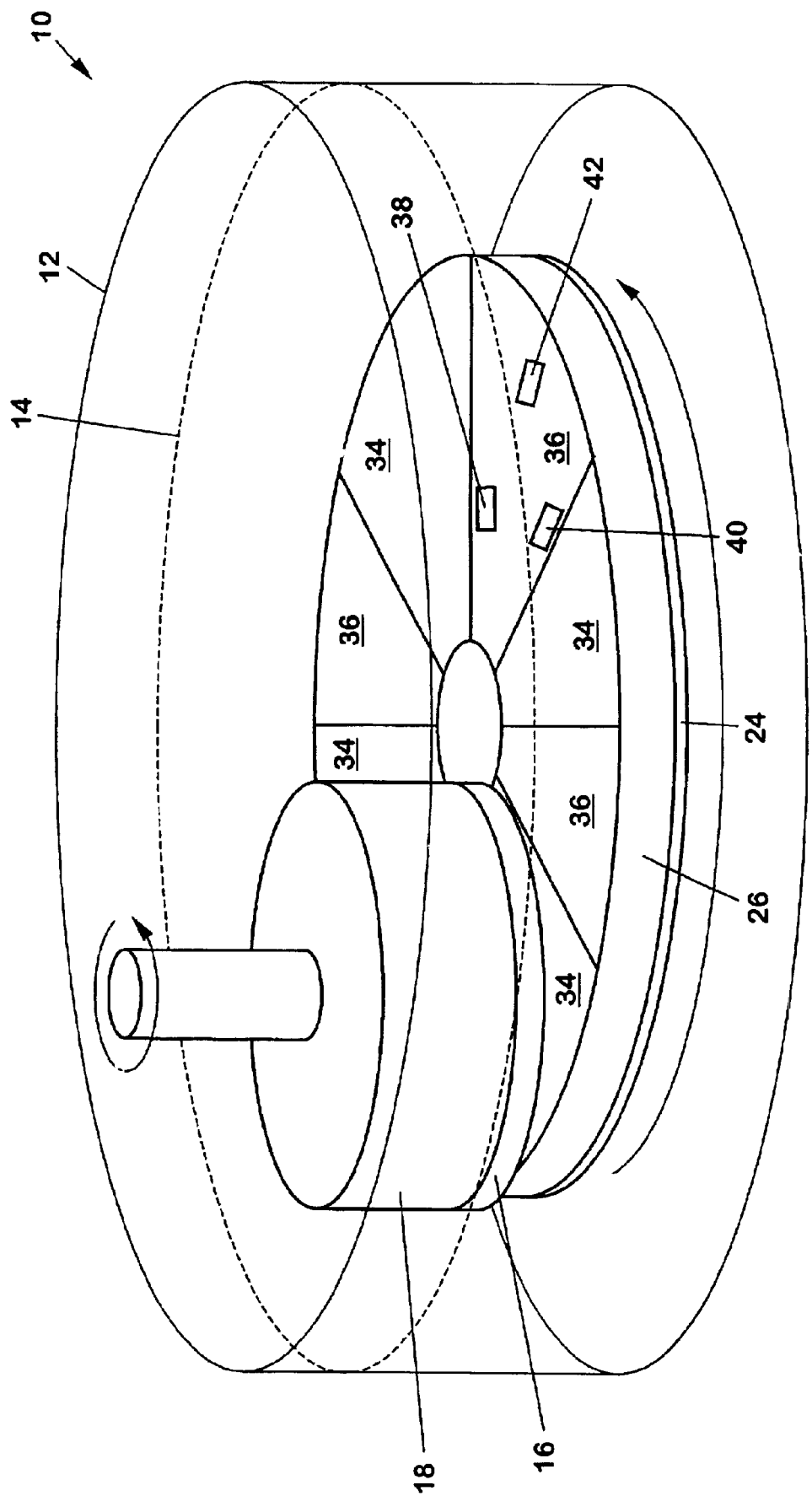
FIG. 1 depicts a perspective view of a system according to a preferred embodiment of the invention.
Figure 2:
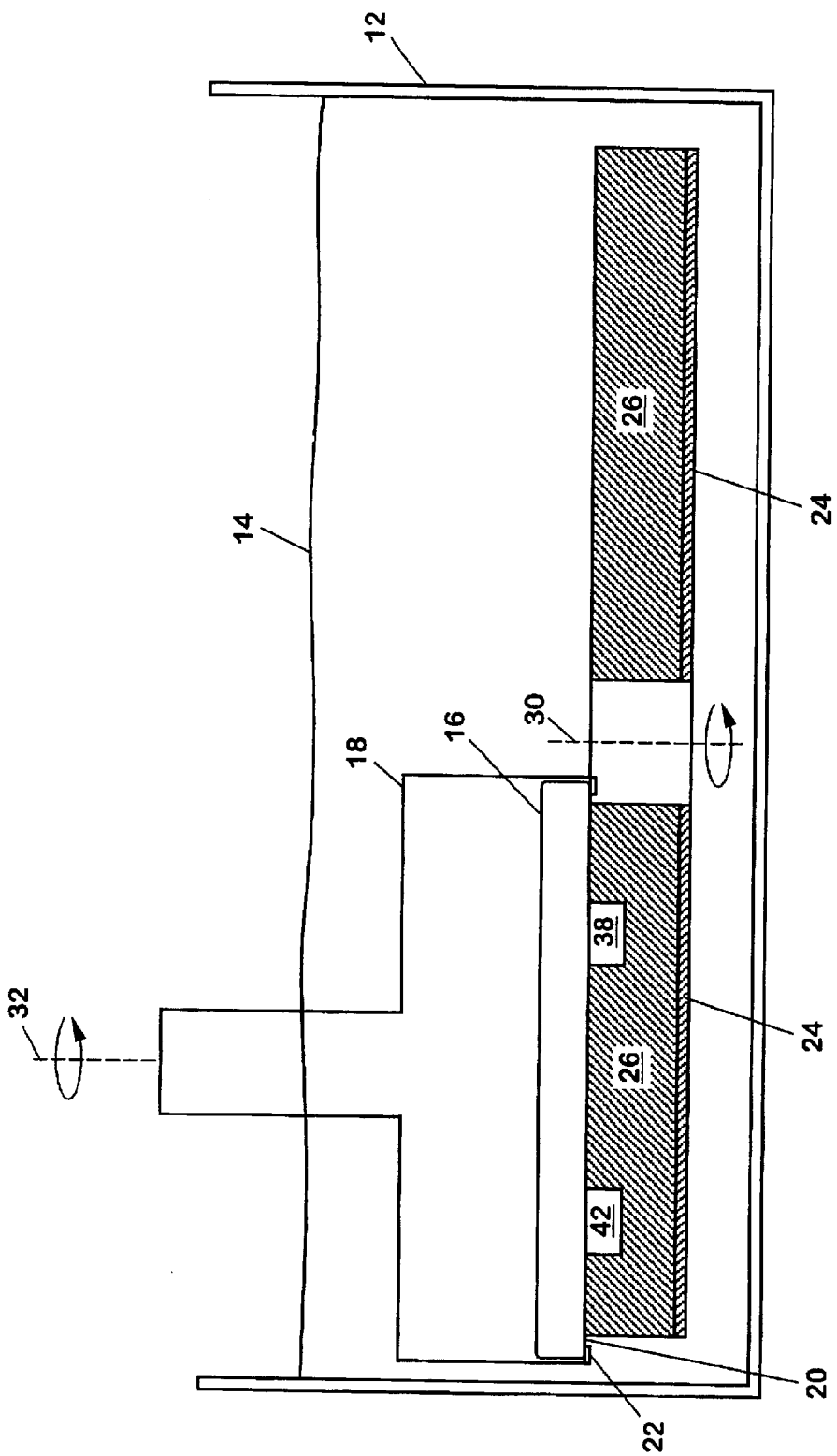
FIG. 2 depicts a cross-sectional view of the system according to a preferred embodiment of the invention.

Depicted in FIGS. 1–4 is a system for determining an end point of a planarization process, such as an electrochemical planarization process or a chemical mechanical planarization process. As shown in FIGS. 1 and 2, the system includes an apparatus 10, which in one embodiment is configured as an electrochemical planarization system for selectively removing conductive materials, such as copper, from select surfaces of an integrated circuit substrate. In an alternative embodiment, the apparatus 10 is a chemical mechanical planarization system which planarizes a conductive material deposited on the surface of the substrate in a separate processing system.

The apparatus 10, in the case of an electrochemical planarization system, includes a container 12 for holding an electrolytic solution 14. In the case of a chemical mechanical polishing system, the container 12 preferably holds a conductive slurry 14. In either case, the solution 14 within the container 12 is preferably electrically conductive. The substrate 16 is secured to a holder 18, such as a vacuum chuck, which holds the substrate 16 beneath the surface of the solution 14, or alternatively, so that at least the surface 20 of the substrate 16 is beneath the surface of the solution 14. Although only one holder 18 and substrate 16 are depicted in FIGS. 1 and 2, it is appreciated that several such holders could be provided for simultaneously processing several substrates 16.

To begin the electrochemical planarization process, a positive electrical potential is applied to an exposed surface 20 of the substrate 16, such as using an anode contact 22. A negative potential is applied to the solution 14, such as using an cathode plate 24. An electrical current is established between the anode contact 22 and the cathode plate 24, thereby causing molecules of a conductive material, such as copper, to be removed from the surface 20 of the substrate 16, and to go into the solution 14. As described in more detail below, the contacts 22 and 24 may also comprise a working electrode and a counter electrode, respectively, in a potentiostat system.

As shown in FIGS. 1 and 2, the apparatus 10 includes a mechanical pad 26 for wiping, brushing, and/or polishing the surface 20 of the substrate 16. The pad 26 is preferably formed of a nonconductive porous material, such as polyurethane. In the case of a pad 26 used for wiping or brushing, the pad 26 includes one or more relatively soft wiper or brush sections. Preferably, the pad 26 is substantially circular, although other shapes could be used in alternate embodiments. In the preferred embodiment of the invention, the cathode plate 24 is attached to the bottom side of the pad 26. However, it is appreciated that it is not necessary for the plate 24 to be attached to the pad 26.

During the planarization process, the surface 20 of the substrate 16 is preferably brought into contact with the pad 26 as the pad 26 rotates about a first axis 30. The holder 18 preferably spins about a second axis 32, as shown in FIG. 2. The relative motion between the surface 20 of the structure 16 and the surface of the pad 26 wipes or brushes away solution 14 that is saturated with copper ions, thereby allowing fresh solution 14 to reach the surface 20. In the case of an electrochemical mechanical deposition process, the motion between the surface 20 of the structure 16 and the surface of the pad 26 substantially impedes deposition of conductive material on the structure 16 where the pad 26 and the surface 20 make contact. Conductive material deposited in vias, trenches, or other such voids formed within the surface 20 of the substrate 16 is preferably not removed.

As shown in FIG. 1, the preferred embodiment of the pad 26 has an upper surface which includes wiping or polishing regions 34 and at least one electrode region 36. The wiping or polishing regions 34 preferably provide the mechanical wiping or polishing action as described above. Within the electrode regions 36 are provided a set of electrodes for detecting certain electrochemical characteristics, such as may be interpreted as an end point of the polishing operation (Steps 100 and 102 in FIG. 4). The electrode regions 36 preferably also provide mechanical wiping action as do the regions 34, but also provide the functions as described below.

In a preferred embodiment of the invention, the electrodes disposed within one or more of the electrode regions 36 preferably include a working electrode 38, a counter electrode 40, and a reference electrode 42 which are coupled to a voltage sensing circuit 44, such as a potentiostat. The working electrode 38, which is also referred to herein as a first electrode, is preferably formed of the same conductive material as is deposited on the surface of the substrate 16, which is most preferably copper. The reference electrode 42, which is also referred to herein as a second electrode, is preferably formed of saturated calomel. The counter electrode 40 is preferably formed of platinum.

In the preferred embodiment of the invention, when the electrode region 36 is brought into contact with the substrate 16, the working electrode 38 makes electrical contact with the surface 20 (step 104), while the reference electrode 42 and counter electrode 40 remain immersed in the solution 14 (step 106). During the electrochemical planarization process, two half reactions occur: an anodic reaction at the working electrode 38, and a cathodic reaction at the counter electrode 40. When such an electrode configuration is present, the electrode 22 depicted in FIG. 2 is not necessary, and is omitted in some embodiments.

Figure 3:
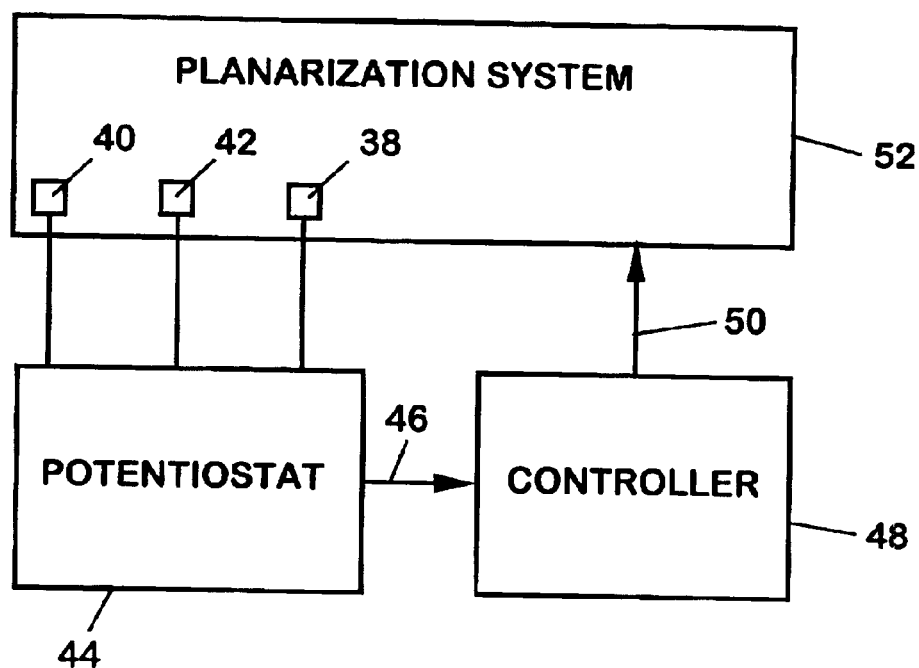
FIG. 3 depicts an apparatus for determining an end point of a process according to a preferred embodiment of the invention.
Figure 4:
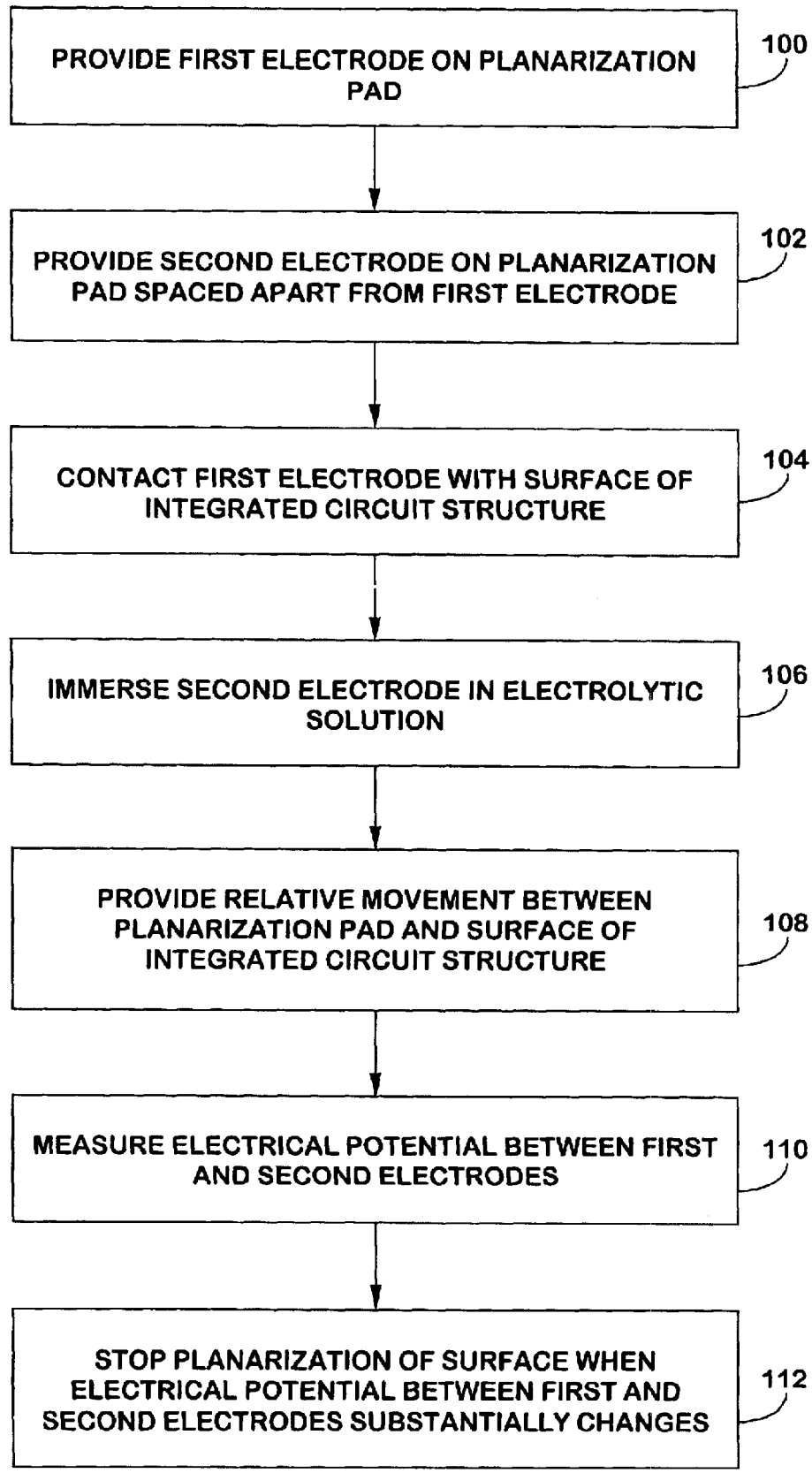
FIG. 4 is a flow chart depicting a method for determining an end point of a process according to a preferred embodiment of the invention.

In the preferred embodiment, as depicted in FIG. 3, the working, reference, and counter electrodes 38, 42, and 40 are coupled to a potentiostat 44. The potentiostat 44 senses an electrochemical potential between the working and reference electrodes 38 and 42 (step 110), and generates an output signal 46 based thereon. When the working electrode 38 contacts the surface 20 of the substrate 16, and a layer of the conductive material, such as copper, is present on the surface 20 (FIG. 2), the electrochemical potential of the system is determined by the chemical reaction between copper and the electrolytic solution 14. As the conductive material on the surface 20 is removed by the electrochemical reaction and the movement of the pad 26 relative to the substrate 20 (step 108) to expose the underneath layer, which is typically a barrier metal and dielectric layer, the electrochemical potential of the system changes. This change is utilized to sense the end point of the electrochemical planarization process.

In the preferred embodiment, the end point of the planarization process is indicated by a "substantial" change in electrochemical potential between the solution 14 and the copper on the surface. Preferably, a substantial change is indicated when the electrochemical potential increases beyond a threshold level. Alternatively, a substantial change as used herein is one in which the slope of a plot of an electrical characteristic, such as electrochemical potential versus time, changes at a rate that does not follow the trend of the data preceding it. Thus, there are real-time mathematical techniques that can be used to identify such a point in a data stream, which point is not tied to a single threshold limit.

The output signal 46 is preferably provided to a controller 48 which controls the operation of the planarization system 52. When the output signal 46 indicates that the planarization end point is reached, the controller 48 preferably issues instructions to the planarization system 52 to stop the process (step 112).

The present invention provides a more accurate indication of the end point of a planarization process than was previously available. If the planarization end point is inaccurate, then the planarization process removes either too much or too little material from the surface of the substrate. When too little material is removed, regions of conductive material may remain on the polished surface which form undesired short circuits between conductors in the substrate. When too much material is removed during planarization, some very thin material layers beneath the conductive material layer may be unintentionally removed along with the conductive material. The invention cures the inadequacies of the previous systems by providing an end point indication substantially at the time when the conductive material is completely removed.

In an alternative embodiment of the invention, the working (first) electrode comprises the anode contact 22, the counter electrode comprises the cathode plate 24, and the reference (second) electrode is disposed in the electrolytic solution or slurry 14. Thus, the invention is not limited to any particular location of the working, reference, and counter electrodes within the planarization apparatus.

It is further appreciated that the invention, although described above with particularity in regard to an electrochemical planarization apparatus, is equally applicable to a chemical mechanical polishing apparatus. In other words, those portions of the apparatus described above in regard to the electrochemical metal removal functions are obviated, and those portions of the apparatus described above in regard to the mechanical polishing, measurement, and control functions are retained.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A method for controlling a process, wherein a thickness of a conductive material is altered on a surface of a substrate as a part of the process, the method comprising the steps of:
    (a) contacting the substrate with an electrically conductive solution,
    (b) establishing intermittent electrical continuity between the surface of the substrate and a first electrode,
    (c) establishing electrical continuity between the electrically conductive solution and a second electrode,
    (d) measuring a value of an electrochemical property between the first electrode and the second electrode,
    (e) interpreting the value of the electrochemical property as a measure of the electrical conductivity of the surface of the substrate, and
    (f) controlling the process based on the value of the electrochemical property.

2. The method of claim 1 wherein the electrical conductivity of the surface of the substrate is indicative of the presence of the conductive material on the surface of the substrate.

3. The method of claim 1 wherein the first and second electrodes are disposed within a rotating pad that contacts the surface of the substrate.

4. The method of claim 1 wherein the first electrode comprises a working electrode in a potentiostat system.

5. The method of claim 1 wherein the second electrode comprises a reference electrode in a potentiostat system.

6. The method of claim 1 further comprising establishing electrical continuity between the electrically conductive solution and a third electrode.

7. The method of claim 6 wherein the third electrode comprises a counter electrode in a potentiostat system.

8. A method for determining an end point of an electrochemical planarization process, where the electrochemical planarization process includes removing at least a portion of a metal layer from a surface of a substrate submerged in an electrolytic solution, the method comprising:
    (a) providing a first electrode operable to contact the surface of the substrate,
    (b) providing a second electrode operable to contact the electrolytic solution,
    (c) intermittently contacting at least the fast electrode to the surface of the substrate,
    (d) measuring a change in an electrical property between the first and second electrodes as at least the first electrode contacts the surface of the substrate, the change in the electrical property indicative of a change in conductivity of the surface of the substrate, and
    (e) controlling the electrochemical planarization process based on the measured change in the electrical property.

9. The method of claim 8 wherein step (d) further comprises measuring a change in an electrochemical potential between the first and second electrodes as at least the first electrode contacts the surface of the substrate.

10. The method of claim 9 wherein step (e) further comprises stopping the planarization process when a substantial increase in the electrochemical potential between the first and second electrodes is measured.

11. The method of claim 8 wherein step (d) further comprises measuring electrical resistance between the first and second electrodes as at least the first electrode contacts the surface of the substrate.

12. The method of claim 11 wherein step (e) further comprises stopping the planarization process when a substantial change in the electrical resistance between the first and second electrodes is measured.

13. The method of claim 8 further comprising:
    step (a) including providing the first electrode in a first portion of a surface of a pad;
    step (b) including providing the second electrode in the first portion of the surface of the pad, and spaced apart from the first electrode;
    step (c) including contacting the surface of the pad the surface of the substrate;
    (f) providing a brush member in a second portion of the surface of the pad, the brush member operable to contact the surface of the substrate; and
    (g) providing relative movement between the surface of the pad and the surface of the substrate as the surface of the pad contacts the surface of the substrate.

14. The method of claim 8 wherein:
    step (a) further comprises providing a working electrode of a potentiostat system; and
    step (b) further comprises providing a reference electrode of the potentiostat system.

* * * * *